Aug. 6, 1940.　　　　H. LINDSAY　　　　2,210,249

MEANS FOR CLAMPING GIRDERS AND THE LIKE TOGETHER

Filed Aug. 8, 1939

INVENTOR:
Henry Lindsay
ATTORNEYS:
Cushman, Darby, & Cushman

Patented Aug. 6, 1940

2,210,249

UNITED STATES PATENT OFFICE 2,210,249

MEANS FOR CLAMPING GIRDERS AND THE LIKE TOGETHER

Henry Lindsay, Bradford, England, assignor to Henry Lindsay Limited, Bradford, England Application August 8, 1939, Serial No. 289,013
In Great Britain September 12, 1938

5 Claims. (Cl. 189—35)

This invention relates to means for clamping girders and the like together, said means being suitable for use with either forged hook bolts or with hook adapters for plain bolts as set forth in the specifications of British Letters Patent Nos. 411,400, 461,953 and 483,121; the chief object being the provision of a new or improved means for adequately supporting forged hook bolts and hook adapters for plain bolts when these are used for fastening brackets to girders, rails to sleepers, or for clamping two girders or like members together.

According to the invention the supporting means comprises a rigid plate member having an aperture through which the shank of the hook bolt or the plain bolt of the hook adapter passes, said plate member being provided with one or more rigid upstanding buttresses or lugs which engage and support the rear of the hook bolt head or of the hook adapter as the case may be.

In order that the invention may be clearly understood and readily carried into effect, the same will now be more fully described with reference to and by the aid of the accompanying drawing; wherein.

Figure 1:
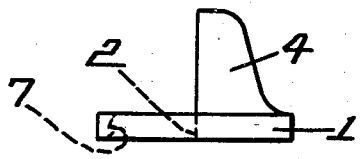
Figures 1 and 2 are a side elevation and a plan view respectively of the supporting means for application to a forged hook bolt.
Figure 2:
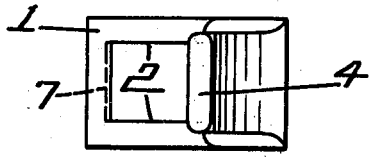
Figure 3:
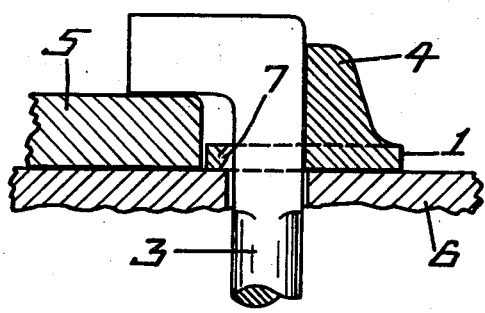
Figure 3 is a sectional side elevation illustrating the application of the supporting means shown in Figures 1 and 2 to a forged hook bolt.
Figure 4:
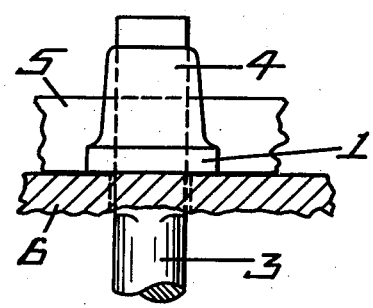
Figure 4 is a rear elevation of Figure 3.

Referring to Figures 1 to 4 inclusive of the drawing, the support comprises a rigid plate member 1 provided at 2 with an aperture to receive the shank of the hook bolt 3. A rigid buttress or lug 4 engages the rear of the hook bolt head thus preventing any tendency for the hook bolt to tilt or lean away from the flange 5 of the girder or other member which it engages.

Figure 5:
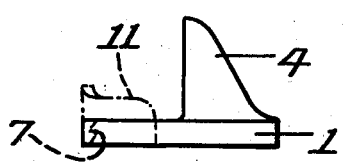
Figures 5 and 6 are a side elevation and a plan view respectively of a modified form of supporting means suitable for use with a hook bolt adapter.
Figure 6:
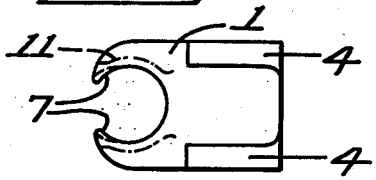
Figure 7:
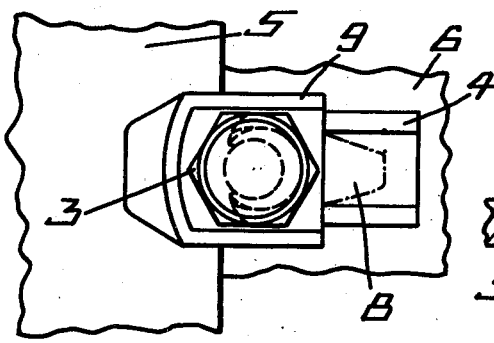
Figure 7 is a plan view illustrating the application of the supporting means shown in Figures 5 and 6 to a hook bolt adapter.
Figure 8:
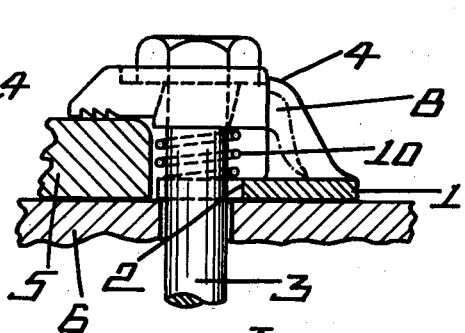
Figure 8 is a part sectional side elevation of Figure 7.

The plate member 1 is supported by the base plate 6 upon which it rests and to which the girder flange 5 is clamped. The front inner face 7 of the aperture 2 is preferably serrated or provided with a knife edge so that the forward end of the apertured plate member 1 is prevented from rising under the pressure of the bolt 3. In the embodiment illustrated in Figures 5 to 8 inclusive, the apertured plate 1 is provided with a pair of upstanding buttresses or lugs 4 having a space between them to accommodate the depending spur 8 of the hook adapter 9, so that the hook adapter 9 may be supported solely by the buttresses or lugs 4 with or without the spur 8 engaging the plate member 1, and similarly for supporting a hook adapter in which the spur 8 is omitted. The hole indicated at 2 in the plate member may be of such a shape that the plain bolt 3 is held close to the girder or rail flange and in this connection the hole may break through the front edge of the plate member 1, and the front edge or edges of the hole will preferably be serrated at 7 so that the front or forward end of the plate member 1 will be prevented from rising.

In order to assist in keeping the hook adapter 9 and the support in position prior to the plain bolt 3 being tightened up, a helical spring 10 may be inserted between them which bears against the lower face of the hook adapter 9 and the upper face of the plate member 1, thus keeping the upstanding buttresses or lugs 4 in contact with the rear of the hook adapter. If desired, an abutment or abutments 11 (see Figures 5 and 6) may be provided on the plate member 1 so as to afford an additional grip on the bolt and prevent the said plate member 1 from tilting.

With a support constructed according to the invention any tendency for the hook bolt or hook adapter to tilt or lean away from the girder it engages is eliminated, whilst at the same time a single support renders a hook bolt or hook adapter and plain bolt applicable to a large range of thicknesses of girder or rail flanges, beams etc.

I claim:

1. In combination with a base member, a flanged member resting on the base member, means for clamping said members together, said means including a plate mounted on the base member and spaced laterally from said flanged member, said plate having an aperture, buttress means extending upwardly from said plate adjacent the aperture, a retaining member having a depending shank extending through said aperture and said base member, means associated with said shank and engaging said flanged member for moving the latter into firm engagement with the base member when the parts are set up, said buttress means engaging and supporting the adjacent side of said shank to prevent the retaining member from tilting or leaning away from said flanged member, and the wall of said aperture having gripping means engaging the shank to prevent raising of the plate relative to the base member when the parts are in their clamped position.

2. In combination with a base member, a flanged member resting on the base member, means for clamping said members together, said means including a rigid plate mounted on the base member and spaced laterally from said flanged member, said plate having an aperture therein provided with a serrated wall portion, a lug extending upwardly from the plate adjacent said aperture, a hook bolt having its shank extending through said aperture and said base member, said serrated portion engaging the shank to prevent upward movement of the plate relative to the base member, said bolt having its head engaging said flanged member so as to move and maintain the latter in firm engagement with the base member, and said lug engaging and supporting the adjacent side of the bolt to prevent the latter from tilting or leaning away from said flanged member.

3. In combination with a base member, a flanged member resting on the base member, means for clamping said members together, said means including a rigid plate mounted on the base member and spaced laterally from said flanged member, said plate having an opening provided with an interrupted portion adjacent the flanged member, a pair of spaced lugs extending upwardly from the base member, a hook adapted having an opening registering with said aperture, and a bolt extending through the opening in the adapter and said aperture for moving the adapter into firm engagement with the flanged member to secure the latter to the base member, said spaced lugs engaging the side of said adapter for preventing the adapter from tilting or leaning away from said flanged member, the interrupted portion of said aperture allowing the bolt to be positioned close to the edge of the flanged member when the parts are set up.

4. In combination with a base member, a flanged member resting on the base member, means for clamping said members together, said means including a rigid plate mounted on the base member and spaced laterally from said flanged member, said plate having an opening provided with an interrupted portion adjacent the flanged member, a pair of spaced lugs extending upwardly from the base member, a hook adapter having an opening registering with said aperture, a bolt extending through the opening in the adapter and said aperture for moving the adapter into firm engagement with the flanged member to secure the latter to the base member, said spaced lugs engaging the side of said adapter for preventing the adapter from tilting or leaning away from said flanged member, the interrupted portion of said aperture allowing the bolt to be positioned close to the edge of the flanged member when the parts are set up, and means in the wall of the aperture engaging said bolt for preventing upward movement of the plate member relative to the base member.

5. In combination with a base member, a flanged member resting on the base member, means for clamping said members together, said means including a rigid plate mounted on the base member and spaced laterally from said flanged member, said plate having an opening provided with an interrupted portion adjacent the flanged member, a pair of spaced lugs extending upwardly from the base member, a hook adapter having an opening registering with said aperture, said adapter having a depending spur engaging the plate between said lug, a bolt extending through the opening in the adapter and said aperture for moving the adapter into firm engagement with the flanged member to secure the latter to the base member, said spaced lugs engaging the side of said adapter for preventing the adapter from tilting or leaning away from said flanged member, the interrupted portion of said opening allowing the bolt to be positioned close to the edge of the flanged member when the parts are set up, and a helical spring surrounding said bolt and confined between the adapter and the base member for maintaining the adapter in position prior to the tightening up of the bolt.

HENRY LINDSAY.